No. 729,819. PATENTED JUNE 2, 1903.
J. F. WEBB.
APPARATUS FOR USE IN EXTRACTING METALS FROM ORES.
APPLICATION FILED JULY 25, 1902.
NO MODEL.
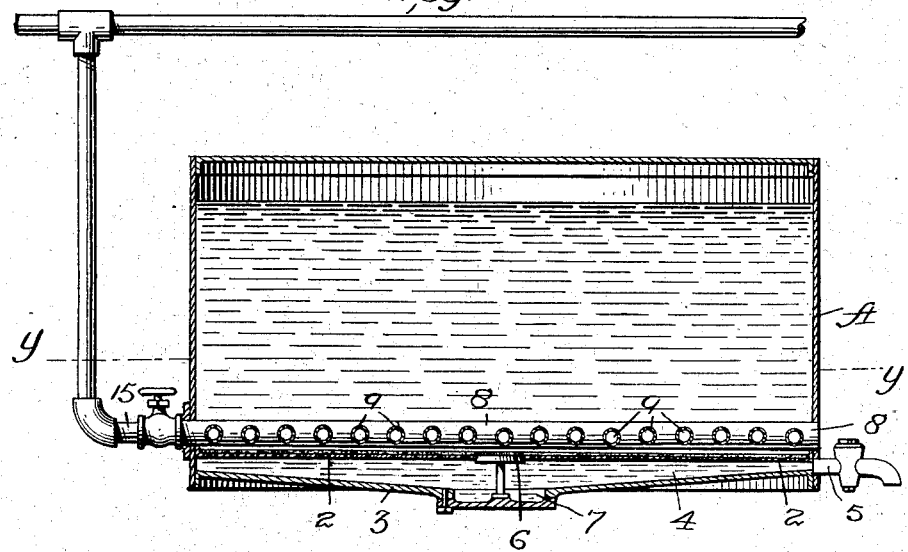
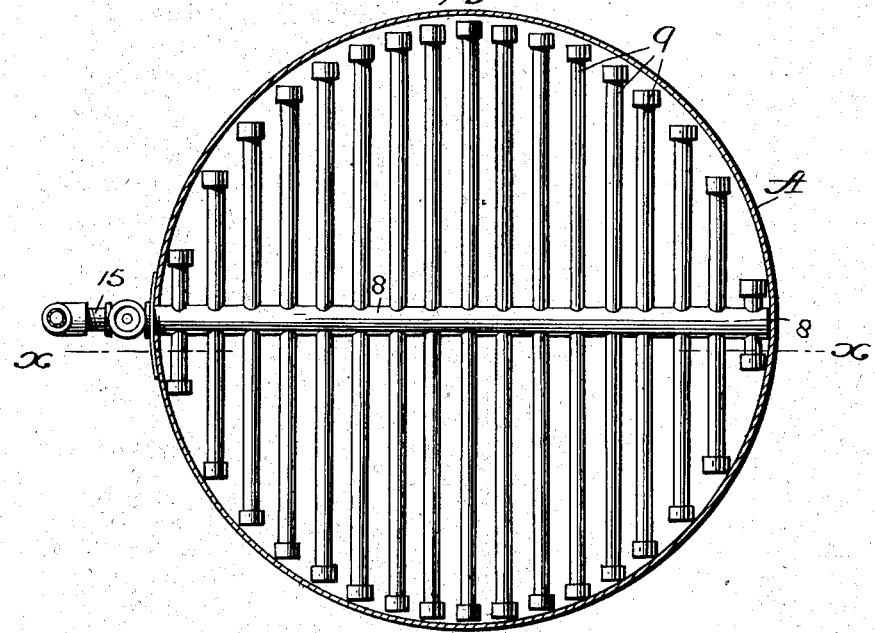
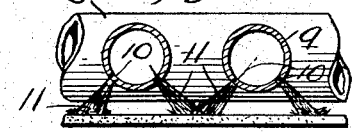
Attest:
C. J. Middleton
Edw. L. Reed
Inventor,
Jean F. Webb.
by — Ellis Spear
Atty No. 729,819. Patented June 2, 1903.

UNITED STATES PATENT OFFICE.

JEAN FRANCIS WEBB, OF DENVER, COLORADO, ASSIGNOR TO PNEUMATIC CYANIDE PROCESS COMPANY, A CORPORATION OF COLORADO.

APPARATUS FOR USE IN EXTRACTING METALS FROM ORES.

SPECIFICATION forming part of Letters Patent No. 729,819, dated June 2, 1903.

Application filed July 25, 1902. Serial No. 117,031. (No model.)

*To all whom it may concern:*

Be it known that I, JEAN FRANCIS WEBB, a citizen of the United States, residing at Denver, Colorado, have invented certain new and useful Improvements in Apparatus for Use in the Extraction of Metals from Their Ores, of which the following is a specification.

My invention relates to the extracting of metals from their ores by means of solvents and the application of atmospheric air thereto. I show it herein especially as applied to the extraction of gold and silver from their ores by means of a solution of cyanid of potassium, but without limiting myself either as to the kind of ore or the particular solvent mentioned herein.

Apparatus has been heretofore known for supplying the oxygen necessary for the reaction which takes place in the reduction of ores through the agency of solutions requiring such presence of oxygen by means of air supplied through perforated pipes located underneath the false or filter bottom of the tank. I have found that when the pipes are so located unequal resistance in the filter causes the air forced through the false or filter bottom to act in spots or locally, so that not only are large areas of the filtering-bottom unaffected, but also the air is forced in comparatively large streams through parts only of the mass of crushed ore and solution in the tank, whereby not only is the filtering unequal, but the agitation of the said mass and the distribution of the oxygenizing agent are unequal and impaired.

The devices by which I have remedied the difficulties inherent in the apparatus heretofore known and by which I have rendered its operation effective are hereinafter fully explained in connection with the accompanying drawings, in which—

Figure 1 represents the apparatus in transverse vertical section on line x x of Fig. 2. Fig. 2 is a horizontal section on line y y of Fig. 1. Fig. 3 shows an enlarged detail view.

In the drawings the tank is shown at A; but I wish it understood that the form shown is only for illustration and that the form and extent may be varied at pleasure. Near the bottom of the tank is located the false bottom 2. This is composed of any material of suitable strength and filtering qualities for the work to be done. I prefer to use a wooden grating covered with burlap on the upper surface. Below the false or filtering bottom is the true bottom 3, and an intermediate chamber 4 is shown, into which the liquid may percolate through the filter or false bottom. A pipe 5 from this chamber with a suitable stop serves for drainage. For the removal of the pulp holes are provided in the false bottom, as shown at 6, and in line therewith in the true bottom are holes, as shown at 7, with suitable detachable covers, these holes being in number adapted to the area of the bottom or size of tank.

Above the false or filter bottom, but located near it, is a main pipe or header 8, which is placed, preferably, diametrically across the false bottom. This may be made of cast-iron, and it is connected with a pipe, as 15, leading from any suitable air-forcing apparatus. From the main pipe or header the air is distributed through branch pipes or members 9. These are made to conform to the shape of the tank, that shown being cylindrical, and the pipes are therefore made in varying lengths, so as to reach every part of the bottom. These branch members are capped or closed at their outer ends by any suitable method and are perforated, as illustrated more clearly in Fig. 3.

It is necessary for the best effect that the air-currents should be evenly and generally distributed over the whole extent of the filter-bottom. For such effect there should be even and uniform agitation throughout the mass of crushed ore and liquid in the tank, and there should be also the same even and uniform distribution of the air to every particle of ore in the tank. To these ends, therefore, the currents of air should be finely divided, and I provide numerous orifices in every branch pipe, so that there may be many small currents of air in every part of the tank. It will be understood also that fine particles and slime to a greater or less degree, according to the nature of the ore treated, settle on the false bottom, and my aim is to keep the filter clear of the fine ore or slime and carry this to the surface by the action of the air. These materials tend to clog the filter and to impair its efficiency, and to prevent this tendency I utilize the jets of air by turning them downward, so as to cause them to impinge upon the bottom and by their action sweep the surface and keep it clear of the slime and fine particles. The arrangement of these orifices is shown at 10 in Fig. 3. They are made in both sides of each pipe about forty-five degrees from the vertical diameter, so as to direct the jet 11 at an angle of forty-five degrees, more or less, to the bottom. The lines of jets from adjacent pipes are thus directed toward each other, as shown in the figures, and preferably I stagger the orifices so that the orifices of one pipe are opposite the spaces between orifices in the opposite pipe. This more effectually covers the whole surface.

The proportion of the number of pipes and orifices to any given area of bottom may be left to the skill of the workman to be determined by the special conditions of the work to be done; but ordinarily a space of three inches between the branch pipes or members would be sufficient, and generally it may be stated that these spaces and the distance between the orifices should be sufficient to keep the filter-bottom clear. This even distribution of the air upon the false bottom besides permitting the filter to act without obstruction and uniformly at the same time constantly supplies the air equally spread over the false bottom and free to rise to all parts of the mass above the bottom.

I have shown only one header; but there may be more than one and, further, the pipe may be arranged in the form of a coil, the several folds of the coil serving as the members or branches herein shown.

I claim—

1. An apparatus for extracting metals by chemical process, the same comprising a tank provided with a filter-bottom, and a perforated pipe placed within the tank above and near the filter-bottom and connected with an air-supply device, said perforations being arranged to discharge the streams of air upon the bottom, substantially as described.

2. In an apparatus for extracting metals from their ores, a tank provided with a filter-bottom, and a pipe or header fitted to supply air, said pipe having lateral parallel branches, extending across and near the said bottom within the tank, said branch pipes being provided with perforations arranged to discharge small streams of air downward upon the bottom; substantially as described.

3. A tank for use in extracting metals by chemical process from their ores, having a filter-bottom and means for discharging air within the tank and downwardly upon the said bottom whereby the said bottom is kept free from clogging and air is supplied to agitate the mass within the tank and supply oxygen thereto, substantially as described.

In testimony whereof I affix my signature in presence of two witnesses.

JEAN FRANCIS WEBB.

Witnesses:
A. C. HARTMAN,
W. C. MACDONALD.